(12) United States Patent
Rasser et al.

(10) Patent No.: US 12,297,003 B2
(45) Date of Patent: May 13, 2025

(54) METHOD FOR FORMING BIODEGRADABLE BAGS

(71) Applicant: Otium Packaging Technology BV, Amsterdam (NL)

(72) Inventors: Jacobus Cornelis Rasser, Amsterdam (NL); Hendrik Jan van den Berg, Hoofddorp (NL)

(73) Assignee: Otium Packaging Technology BV, Amsterdam (NL)

( * ) Notice: Subject to any disclaimer, the term of this patent is extended or adjusted under 35 U.S.C. 154(b) by 671 days.

(21) Appl. No.: 17/297,497

(22) PCT Filed: Nov. 27, 2019

(86) PCT No.: PCT/NL2019/050788
§ 371 (c)(1),
(2) Date: May 27, 2021

(87) PCT Pub. No.: WO2020/111942
PCT Pub. Date: Jun. 4, 2020

(65) Prior Publication Data
US 2022/0033117 A1   Feb. 3, 2022

(30) Foreign Application Priority Data

Nov. 30, 2018 (NL) ..................................... 2022100
Jan. 28, 2019 (NL) ..................................... 2022463

(51) Int. Cl.
*B65B 9/20* (2012.01)
*B65B 51/06* (2006.01)
(Continued)

(52) U.S. Cl.
CPC ................ *B65B 9/20* (2013.01); *B65B 51/06* (2013.01); *B65B 61/02* (2013.01); *B65B 65/06* (2013.01); *B65D 65/466* (2013.01); *B65D 75/44* (2013.01)

(58) Field of Classification Search
None
See application file for complete search history.

(56) References Cited

U.S. PATENT DOCUMENTS 3,066,063 A * 11/1962 Ecklund ................ B21C 37/101
156/218
3,557,525 A * 1/1971 Bauder ................. B29C 66/849
493/190

(Continued)

FOREIGN PATENT DOCUMENTS

EP    3168362 A1 * 5/2017 ............... B65B 9/12

*Primary Examiner* — Tanzim Imam
(74) *Attorney, Agent, or Firm* — N.V. Nederlandsch Octrooibureau (57) ABSTRACT

A method is disclosed for forming a package of a non-weldable material on a vertical form-fill-seal (VFFS) machine or a horizontal form-fill-seal (HFFS) machine. The method comprises providing a continuous web of the non-weldable material having exposed areas of adhesive. In an embodiment the method is implemented on a VFFS machine that has a fill tube designed and configured to avoid interaction with the adhesive exposing areas of the web.
In a preferred embodiment the adhesive exposing areas are formed by providing a repeating pattern of sets of apertures in the web, and fully covering each set with a label that is coated with adhesive.

15 Claims, 9 Drawing Sheets

(51) Int. Cl.
*B65B 61/02* (2006.01)
*B65B 65/06* (2006.01)
*B65D 65/46* (2006.01)
*B65D 75/44* (2006.01)

(56) References Cited

U.S. PATENT DOCUMENTS

| | | | | |
|---|---|---|---|---|
| 4,991,379 | A * | 2/1991 | Boeckmann | B65B 9/22 |
| | | | | 53/551 |
| 2013/0114918 | A1* | 5/2013 | Lyzenga | B65D 75/5827 |
| | | | | 383/203 |
| 2013/0121623 | A1* | 5/2013 | Lyzenga | B32B 3/263 |
| | | | | 383/203 |
| 2016/0023810 | A1* | 1/2016 | Zerfas | B65D 33/34 |
| | | | | 493/264 |
| 2017/0151765 | A1* | 6/2017 | Ohman | B65B 9/20 |

* cited by examiner

METHOD FOR FORMING BIODEGRADABLE BAGS

BACKGROUND OF THE INVENTION

1. Field of the Invention

The invention relates generally to a method for forming biodegradable bags on a form-fill-seal machine, more specifically for forming such bags on a vertical form-fill-seal (VFFS) machine or on a horizontal form-fill-seal (HFFS) machine.

2. Description of the Related Art

Prior art processes for forming bags on a form-fill-seal machine use a roll stock of, for example, a polymer film (such as a polyethylene film), cellophane laminates, foil laminates, and paper laminates. What these materials have in common is that they consist of or present an outer layer of a thermoplastic polymer. Seals are formed in the bag by locally heating the roll stock material and pressing adjoining surfaces of the roll stock material together. In general, no adhesives are used in forming the bags. Instead, the polymer material of the roll stock is relied upon to provide the required seals.

There is a growing awareness of the littering problems caused by plastic packaging. For example, Directive (EU) 2015/720 of the European Union reflects a concerted political effort to reduce the consumption of plastic bags. As this directive notes, so-called biodegradable plastics do not offer a satisfactory solution, as the breakdown of these plastics is too slow to appreciably alleviate the littering problem.

To a limited extent, paper laminate materials are being used as packaging materials. Although these materials may suggest environmental responsibility to the non-discerning consumer, their use is in fact highly questionable from an environmental perspective. Paper/polymer laminates are not biodegradable due to the presence of the polymer layer. These materials cannot be recycled in the paper recycle stream, due to the presence of the polymer layer, and they cannot be recycled in a plastic recycle stream due to the presence of the paper layer.

In addition there is a desire to use renewable resources for packaging. Paper is generally recognized as an environmentally friendly renewable resource.

Thus, there is a need for a method of forming biodegradable bags on a form-fill-seal machine. There is a further need for a method that is suitable for forming paper bags on a form-fill-seal machine. There is yet a further need for minimizing the amount of non-recyclable materials, such as inks and adhesives, to produce paper bags that are at least 95% recyclable.

BRIEF SUMMARY OF THE INVENTION

The present invention addresses these problems by providing a method for making a biodegradable package on a form-film-seal machine, said method comprising the steps of:
 a. providing a continuous web of a biodegradable material, said web having a machine direction and a cross-machine direction;
 b. providing on the web discrete areas of exposed adhesive;
 c. forming a seal in the machine direction of the web by adhering overlapping edges of the web to one another;
 d. forming seals in the cross-machine direction of the web using the discrete areas of exposed adhesive.

The method may be practiced on a vertical form-fill-seal (VFFS) machine or on a horizontal form-fill-seal (HFFS) machine.

In an embodiment the method is for making a biodegradable package on a vertical form-film-seal machine, and comprises the steps of:
 a. providing a continuous web of a biodegradable material, said web having a machine direction and a cross-machine direction;
 b. providing on the web discrete areas of exposed adhesive;
 c. pulling the continuous web over a forming shoulder and along a fill tube of the machine so that the areas of exposed adhesive face the fill tube;
 d. forming a seal in the machine direction of the web by adhering overlapping edges of the web to one another;
 e. forming seals in the cross-machine direction of the web using the discrete areas of exposed adhesive;
wherein the fill tube has protrusions to minimize contact with the web; or the fill tube is coated with a non-stick coating; or both.

A preferred biodegradable material for use in the method is paper, in particular Kraft paper.

In an embodiment forming the machine direction seal comprises applying two-sided adhesive tape along a longitudinal edge of the continuous web of biodegradable material.

In an embodiment providing on the web discrete areas of exposed adhesive comprises providing apertures in the web and covering the apertures with an adhesive coated label material.

Another aspect of the invention comprises a continuous web of biodegradable packaging material for use in the method of the invention.

Another aspect of the invention is a biodegradable package made by the method of the present invention.

DETAILED DESCRIPTION OF THE INVENTION

The following is a detailed description of the invention.

Definitions

The formal definition of "biodegradable" is "capable of being decomposed by bacteria or other living organisms."

Informal definitions include a requirement that such decomposition be "rapid" or "quick." In the context of the present invention the term "biodegradable" is used for materials that are capable of being decomposed by bacteria or other living organisms rapidly enough for the material to be decomposed in an industrial composting facility. Paper and cardboard are examples of materials meeting this definition.

The term "recyclable" as used with reference to packaging materials refers to materials that can be treated in an industrial process so that they can be used again. In general the required industrial process causes a degree of degradation of the material, resulting in the recycled material being of a lesser quality. Fresh material, also referred to as 'virgin' material, may be blended with recycled material in order to obtain a desired quality.

The term "renewable" as used with reference to materials refers to materials that are naturally replenished at a rate fast enough to keep up with their use. Examples are agricultural products and forestry products. Paper, which can be made from wood (a forestry product) or from cotton linters (an agricultural product) is considered renewable. Plastic made from fossil resources, such as natural gas, mineral oil or coal, is not a renewable material.

In a conventional vertical form-fill-seal (VFFS) packaging machine a roll of packaging material is formed into a tube shape. Seals are formed by heating the packaging material in predetermined locations and by applying pressure. To make this possible the packaging material must be a thermoplastic polymer, or a laminate having a layer of thermoplastic polymer at least one of its surfaces.

The packaging material for use in a VFFS is provided as a continuous web rolled around a core, which is why it is sometimes referred to as roll stock. On the machine the web is pulled off the roll, and is pulled down a forming shoulder which surrounds a forming tube. The forming shoulder forms the web into a tube, with the two longitudinal (machine direction) edges of the web overlapping each other.

The forming tube may be set up to form a lap seal or a fin seal. To form a lap seal, the inner surface of one overlapping edge is sealed to the outer surface of the other overlapping edge. To form a fin seal the overlapping edges are adhered to each other at their inside surfaces. A lap seal is considered more aesthetically pleasing, but it requires that both the inside surface and the outside surface of the web be suitable for sealing, which is not always the case. For example, if the web is a paper/polyethylene laminate, only the polyethylene surface (typically the inside surface) can be used for forming the seal.

Below the filling tube heated horizontal (cross machine direction) sealing jaws come together to form the top seal of one bag and the bottom seal of the next bag. Once the seal is formed the lower bag is cut loose, and the upper bag is filled with product. The newly formed bag is moved down for its top seal to be formed by the sealing jaws. It should be noted that the horizontal (cross machine direction) seal is formed by mating opposing inside surfaces of the bag.

In conventional VFFS and HFFS processes the roll stock is a thermoplastic material, such as polyethylene (PE) or polypropylene (PP). In cases where a biodegradable material is used, such as paper, the roll stock is laminated on at least one side with a thermoplastic material. The exposed surface of thermoplastic material ensures that the required seals are formed when the roll stock material is clamped between the sealing jaws.

Laminated materials are undesirable from a sustainability perspective. Although the use of paper potentially lowers the carbon footprint of the material (as compared to all-plastic roll stock), laminates are unsuitable for recycle. The presence of the paper layer makes the material unsuitable for incorporation in a plastics recycle stream, and the presence of the thermoplastic layer makes the material unsuitable for a paper recycle stream.

The European Union permits packaging material to be labeled "biodegradable" or "compostable" if it comprises 95% or more biodegradable material. It may be theoretically possible to have a VFFS or HFFS bag meet this requirement by laminating a paper roll stock with a thermoplastic in only those areas where seals must be formed. However, the requirement of providing a dedicated lamination pattern, which is different for each package size, makes this approach prohibitively expensive.

In 2016 Bosch announced the introduction of a module, referred to by Bosch as the ZAP-module, which made it possible to form paper bags on a VFFS machine. However, this method requires a purpose-developed grade of paper with the brand name Axello®ZAP, available from BillerudKorsnäs AB in Sweden. We believe EP 3 168 362 B1 provides a description of this paper.

The purpose of the present invention is to provide a method for forming a VFFS or HFFS bag from a material that is not weldable. Because the material is not weldable, the conventional operation of a VFFS or HFFS machine, which rely on welding to form the necessary seals, is not possible. The method of the invention is particularly useful for non-weldable biodegradable materials, such as paper. An example is conventional paper roll stock, such as Kraft paper. The invention will be illustrated with reference to paper as the packaging material. The method will first be illustrated with reference to a VFFS machine.

In order to form a paper bag on a VFFS machine, three technical problems must be solved: (i) applying adhesive to the seal areas of the paper web; (ii) preventing the adhesive from sticking to or transferring onto parts of the VFFS machine, in particular the forming shoulder and the fill tube; and (iii) forming a reliable seal in a very short time (typically 1 second or less).

A. Applying Adhesive to the Seal Areas of the Paper.

The seal areas of the paper are one or both of the longitudinal edges of the paper (for forming the longitudinal seal), and intermittent bands in the cross-machine direction where the top and bottom seals of the package will be formed.

Suitable methods for applying adhesive to specific areas of the paper include printing and coating. Coating techniques generally form continuous coatings of adhesive in the desired areas. Printing techniques apply patterns, such as lines and swirls.

A preferred method for forming the longitudinal seal is applying a two-sided adhesive tape to one of the longitudinal edges of the paper. Preferred for use herein is adhesive tape having a paper backing. In many cases such adhesive tape is provided with a liner, which protects the adhesive layer during transport and storage. The liner is continuously peeled off the tape, and the tape is pressed against the paper using pressure roller, for example. The seal is formed by adhering the opposite longitudinal edge of the paper to the two-sided tape. Forming this seal is preferably done while the paper is supported by the fill tube of the VFFS.

An important property of the adhesive of the two-sided tape is the 90° peel adhesion at room temperature. Testers for 90° peel adhesion are commercially available. The test is typically carried out with 25 mm wide strips of the material to be tested. Suitable examples of two-sided tape have a 90° peel adhesion at room temperature on stainless steel of from 25 to 45 N/25 mm, and on polyethylene of from 5 to 11 N/25 mm.

For forming the horizontal seals, patterns of adhesive may be applied to predetermined areas of the paper as described earlier.

In an alternate and preferred method, apertures are made in the paper in predetermined areas. Next, labels carrying an adhesive coating are applied to the paper in predetermined areas, such that the adhesive coating of the labels is exposed in those areas where the paper has been apertured. The apertures can be a pattern of holes, for example circular or square holes. These holes can be formed using a conventional punching machine of a type well known in the paper industry. In an alternate embodiment one relatively large aperture is made for each cross-machine direction seal. In this embodiment the apertures generally have an oblong shape, for example a rectangular with rounded corners. The one or more apertures along a cross-machine direction of the web, which together form a horizontal seal, are referred to herein as a set of apertures.

The size, the number and the pattern of apertures is selected to provide sufficient adhesive surface for forming the seal, while leaving sufficient paper surface area for adhering the label to it. In general the combined aperture area corresponds to from about 30% to about 70% of the area of the seal, preferably from about 40% to about 60% of the seal area. It should be kept in mind that the presence of apertures weakens the paper, which may cause problems in the bag forming process upstream of the station where the adhesive label is applied.

An important property of the adhesive of the two-sided tape is the 90° peel adhesion at room temperature. Testers for 90° peel adhesion are commercially available. The test is typically carried out with 25 mm wide strips of the material to be tested. Suitable examples of two-sided tape have a 90° peel adhesion at room temperature on stainless steel of from 25 to 45 N/25 mm, and on polyethylene of from 5 to 11 N/25 mm.

Adhesive coated labels can be applied using conventional labeling modules. The labels comprise a substrate and an adhesive coating. The substrate is preferably an eco-friendly material, such as paper. The substrate may be printed with graphics identifying the product in the bag, the brand of the product, and the like. The adhesive coating is selected so as to provide the required seal strength. The amount of adhesive is greater than would be required for simply adhering the label to the paper, because the main purpose of the adhesive is to form the required seal. In general, the thickness of the adhesive coating is from about—μm to about—μm. If the bag is used for packaging food items the adhesive must be of a type that is approved for such use. Preferred for use herein are pressure sensitive adhesives.

B. Preventing the Adhesive from Sticking to or Transferring to Parts of the VFFS Machine Many adhesive materials have been developed for use in packaging, in particular for paper and cardboard packaging materials. Many of these packaging adhesives are suitable for use in the present invention. The performance profile of an adhesive is determined primarily by three distinct properties: tack, cohesion, and adhesion. The term adhesion refers to the strength of the bond that is formed between the adhesive and the packaging material. Adhesives that have been developed specifically for use with paper packaging materials generally meet the adhesion requirements posed by the present invention.

The term cohesion refers to the strength of the bonds within the adhesive material itself. As such it plays an important role in determining the strength of a seal. As will be explained below, in preferred embodiments of the invention seals are formed at least in part by adhering exposed adhesive surfaces to each other. The strength of the bond being formed in these areas is largely determined by the cohesion of the adhesive material. In particular for these embodiments it is important to select an adhesive material having high cohesive strength. High cohesive strength also inhibits the transfer of adhesive to parts of the VFFS machine that may come into contact with exposed adhesive surfaces of the paper, in particular the forming shoulder and the filling tube.

The term "tack" refers to the strength of bonds that are formed quickly without applying much or any pressure. Preferably the tack at room temperature should be as low as possible, to prevent the adhesive surfaces from sticking to parts of the VFFS machine. Accordingly, preferred adhesive materials are pressure sensitive adhesives having low tack at room temperature. Tack can be determined by a loop tack measurement protocol, such as described in ASTM D6195. Preferred adhesive materials have a loop tack value of from 2 to 10 Newton/10 mm, preferably from 4 to 8 Newton/10 mm.

A second way to prevent the paper from sticking to the filling tube comprises reducing the area of contact between the filling tube and the paper. This can be achieved by providing the outer surface of the filling tube with a plurality of spacers, such as longitudinal ridges or ribs. In use, the filling tube is in contact with the paper only in the areas of the ridges or ribs, greatly reducing the contact areas where the paper contacts the filling tube.

In an embodiment the pattern of apertures is designed so that the paper web has longitudinal bands in which no exposed adhesive is present. According to this embodiment the paper is in contact with the filling tube only in areas of these bands, so that adhesive does not come into contact with the filling tube. It will be understood that this embodiment offers greater flexibility in the selection of the adhesive, in that adhesives with a tack at room temperature of greater than 10 Newton/10 mm can be used without causing problems.

A third way to prevent the paper from sticking to parts of the VFFS machine comprises coating parts of the VFFS machine with a non-stick coating. The term "non-stick coating" refers to a coating that has very low or no adhesion with the adhesive material. Examples of non-stick materials suitable for such coatings include silicone materials and poly(tetrafluoroethylene), which is known under the trade name Teflon®. Aluminum machine parts can be provided with a non-stick aluminum oxide coating by anodization.

A fourth way to prevent paper from sticking to parts of the VFFS machine comprises covering these parts with a coating of mineral particles. Suitable particulate materials include sand and silicate. The mineral particles have a naturally low adhesion for the adhesive material, and their presence on the surface of the machine part minimizes the contact surface between the paper and the machine part. Suitable ways of providing a machine part with a coating of mineral particles include cladding the machine part with sandpaper or glasspaper. Less preferred is cladding the machine part with a fabric presenting the hooks or the loops of a hook-and-loop fastening material (such as Velcro®).

In summary, four different measures have been identified to prevent paper that is provided with exposed adhesive material from sticking to parts of the VFFS machine. These measures are: (i) selecting a low tack adhesive, preferably an adhesive having a loop tack value of from 2 Newton/10 mm to 10 Newton/10, mm; (ii) providing the filling tube with longitudinal ridges and recesses; (iii) coating one or more of the machine parts with a non-stick coating; and (iv) covering one or more of the machine parts with a coating of mineral particles. In preferred embodiments two or more of these measures are combined.

Standard VFFS machines are set up for processing polymeric packaging materials, such as PE or PP. The tear strength of paper is much lower than that of PE and PP. To prevent tearing of paper packaging material on a VFFS machine it is advantageous to avoid apertures in the area of the web that travels over the highest point of the forming shoulder; and to keep the tension of the web as low as possible until the apertures have been "repaired" by applying a label over them, for example by placing an auxiliary web drive upstream of the forming shoulder.

The method as described for use on a VFFS machine may also be implemented on a HFFS machine. Because a HFFS machine does not have parts that may come into contact with exposed adhesive, implementation of the method on a HFFS machine is relatively straightforward, as will be explained below with reference to FIG. 7.

In its broadest aspect the present invention relates to a method for making a biodegradable package on a form-film-seal machine, said method comprising the steps of:
  a. providing a continuous web of a biodegradable material, said web having a machine direction and a cross-machine direction;
  b. providing on the web discrete areas of exposed adhesive;
  c. forming a seal in the machine direction of the web by adhering overlapping edges of the web to one another;
  d. forming seals in the cross-machine direction of the web using the discrete areas of exposed adhesive.

In an embodiment the invention provides a method for making a biodegradable package on a vertical form-film-seal machine, said method comprising the steps of:
  a. providing a continuous web of a biodegradable material, said web having a machine direction and a cross-machine direction;
  b. providing on the web discrete areas of exposed adhesive;
  c. pulling the continuous web over a forming shoulder and along a fill tube of the machine so that the areas of exposed adhesive face the fill tube;
  d. forming a seal in the machine direction of the web by adhering overlapping edges of the web to one another;
  e. forming seals in the cross-machine direction of the web using the discrete areas of exposed adhesive;
wherein the fill tube has protrusions in the machine direction that are in contact with the web, and machine direction recesses that are not in contact with the web.

A preferred biodegradable material for use in the method is paper. Any paper suitable for packaging may be used. Particularly preferred is Kraft paper.

Preferably the adhesive is of a type that does not interfere with the pulping process that is part of the paper recycle process. The paper industry provides standards for adhesives that are considered repulpable.

In certain embodiments the adhesive is itself biodegradable, so that it does not interfere with the goal of achieving maximum biodegradability.

In an embodiment the method comprises a step of applying a double-sided tape to a longitudinal edge of the web. The double-sided tape is preferably applied to the side of the web that forms the interior of the package. The tape is applied to the web upstream of the forming shoulder. The web is pulled over the forming shoulder in usual fashion, thereby forming a tube. The opposite longitudinal edge of the web is put in overlapping arrangement with the tape, and is adhered to the tape by applying pressure.

In an embodiment the discrete areas of exposed adhesive are formed by providing apertures in the web, and applying labels to the web covering the apertures. The labels are applied to the face of the web that will form the exterior of the package, so that the exposed adhesive is on the face of the web that will form the interior of the package. Sets of apertures are arranged along a cross-machine direction of the web, so that the exposed adhesive areas will form a horizontal seal. Generally each label will fully cover the apertures of a set. The number of apertures in a set may range from 1 to 12 or more, depending on the size of the package being formed.

The web is pulled over a forming shoulder of the machine in usual fashion. It has been found advantages to provide a forming shoulder with a more acute angle than is customary for forming plastic packages.

In an embodiment the fill tube of the machine presents spacers at its outer surface.

The spacers serve to reduce the area of contact between the web and the fill tube, thereby reducing the risk of interaction of the exposed adhesive with the fill tube. Any form of spacers may be used. Specific examples include longitudinal ribs, and a pattern of protrusions, for example diamond-shaped protrusions.

In an embodiment at least the spacers are coated with a non-stick coating, such as silicone, polytetrafluoroethylene (Teflon®), anodized aluminum, and the like.

In an alternate embodiment the fill tube does not have spacers and is fully covered with a non-stick coating.

Another aspect of the invention is a VFFS machine for use in the method of the invention. The VFFS machine may be provided with a fill tube having spacers. The spacers, or the entire outer surface of the tube, may be coated with a non-stick coating. The non-stick coating may be made of silicone, polytetrafluoroethylene, or anodized aluminum.

The machine may further comprise a module for applying labels to an aperture continuous web in the areas of the apertures.

Another aspect of the invention is a package formed by the method of the invention.

The package is preferably made of a biodegradable material, such as paper, in particular Kraft paper.

Yet another aspect of the invention is a continuous web of a non-weldable material that is adapted for use in the method of the invention. The non-weldable material is preferably a biodegradable material, such as paper, in particular Kraft paper. The web comprises apertures arranged in a pattern of repeating sets along a cross-machine direction of the web.

Yet another aspect of the invention is a label dimensioned to fully cover the apertures of a set. The label is coated with an adhesive that is suitable for forming the horizontal seals of the package to be formed.

DESCRIPTION OF ILLUSTRATIVE EMBODIMENTS/EXAMPLES

The following is a description of certain embodiments of the invention, given by way of example only.

Figure 1:
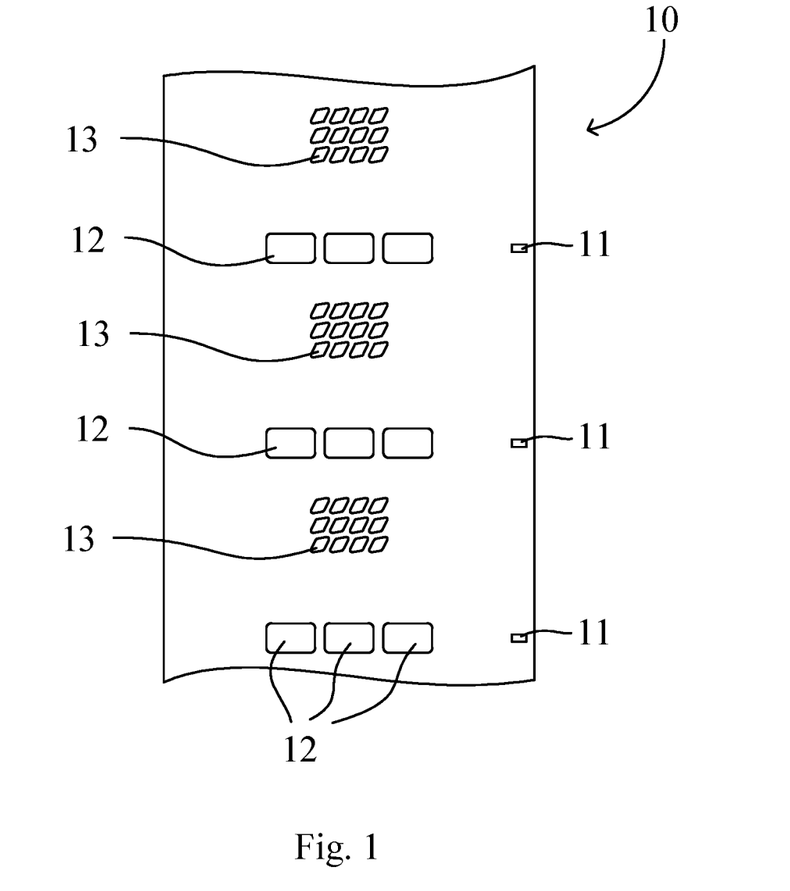
FIG. 1 shows a section of a continuous web for use in the method of the invention.

FIG. 1 shows a portion of a continuous web 10 of Kraft paper that has been specifically configured for use in the present invention. Web 10 is provided with markers 11, which interact with sensors on the packaging machine to ensure proper registration of the web in the machine. The markers may be of any type suitable for interaction with the sensors on the machine. For example, the markers may be rectangles of a contrasting ink, which interact with electronic eyes on the machine.

Apertures 12 are located in the areas where the horizontal (cross-machine direction) seals of the package will be formed. Apertures 12 serve to present an adhesive surface, as will be explained in more detail below. Apertures 12 are arranged in sets along a cross-machine direction of the web. As shown in FIG. 1 each set contains three apertures 12. The dimensions of these apertures are chosen so as to provide a maximum adhesive surface area without unduly weakening the strength of web 10. In general a suitable compromise comprises providing apertures extending over about 40% to 60% of the width of web 10, preferably about 50%.

Apertures 13 provide breathability to the finished package. Whether apertures 13 are required depends on the nature of the product to be contained in the finished package. Many fresh products, such as potatoes and onions, require breathability. Processed products, such as rolled oats, do not. Apertures 13 may be arranged to spell a word or a string of letters, for example "BIO".

Apertures 12 and optional apertures 13 may be provided in paper web 10 by any suitable means, for example die cutting or laser cutting.

Figure 2:
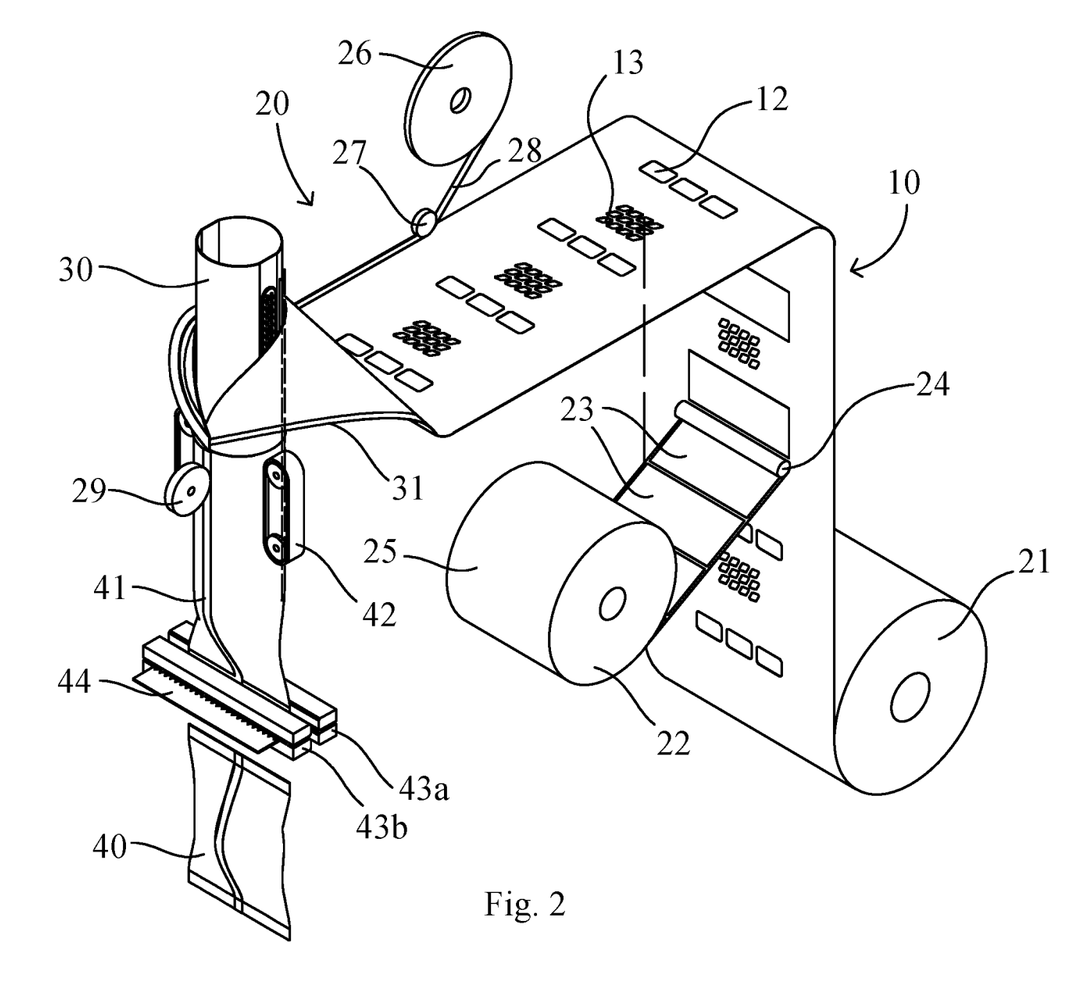
FIG. 2 is a schematic representation of a VFFS machine for use in the method of the invention.

FIG. 2 schematically shows a Vertical Form Fill Seal (VFFS) machine 20, adapted for the process and the package of the present invention. Roll 21 contains a continuous web 10 of a Kraft paper adapted for the package of the present invention, as described above with reference to FIG. 1. Web 10 comprises registration markers (not shown), apertures 12 for presenting an adhesive surface, and apertures 13 for providing breathability.

Roll 22 contains labels 23 on a liner 25. Labels 23 are provided with an adhesive that it used for adhering labels 23 to web 10. Module 24 removes labels 23 from liner 25, and adheres them to web 10. The operation of module 24 is synchronized with the travel of web 10 to ensure that labels 23 each fully cover a set of apertures 12. As shown, labels 23 are wider (in the machine direction of VFFS machine 20) than would be required to fully cover a set of apertures 12, to provide additional strength to the finished package. In other embodiments the width of labels 23 is chosen so as to just fully cover a set of apertures 12. After labels 23 have been applied to web 10, the web presents areas of adhesive at the locations of apertures 12.

Roll 26 contains double sided tape 28, which is unwound and applied to web 10 by roller 27. Double sided tape is covered by a liner, which is removed as the tape is being applied to web 10. The liner may be sucked up by a vacuum hose and conveyed to a bin (not shown). The manner in which the liner is discarded is not relevant to the invention.

Web 10 is pulled over forming shoulder 31 around fill tube 30, in usual fashion. Roller 29 presses an overlapping edge of web 10 against the exposed double-sided tape 28 to form vertical seal 41, thereby forming a tube. The tube is conveyed downward by conveyer belt 42.

Pressure blocks 43a and 43b compress the tube in the area of apertures 12 to form a horizontal seal. After the seal is formed, product to be packaged is introduced into the tube via fill tube 30, in usual fashion. Completed package 40 is separated from the tube by operation of knife 44.

Figure 6A:
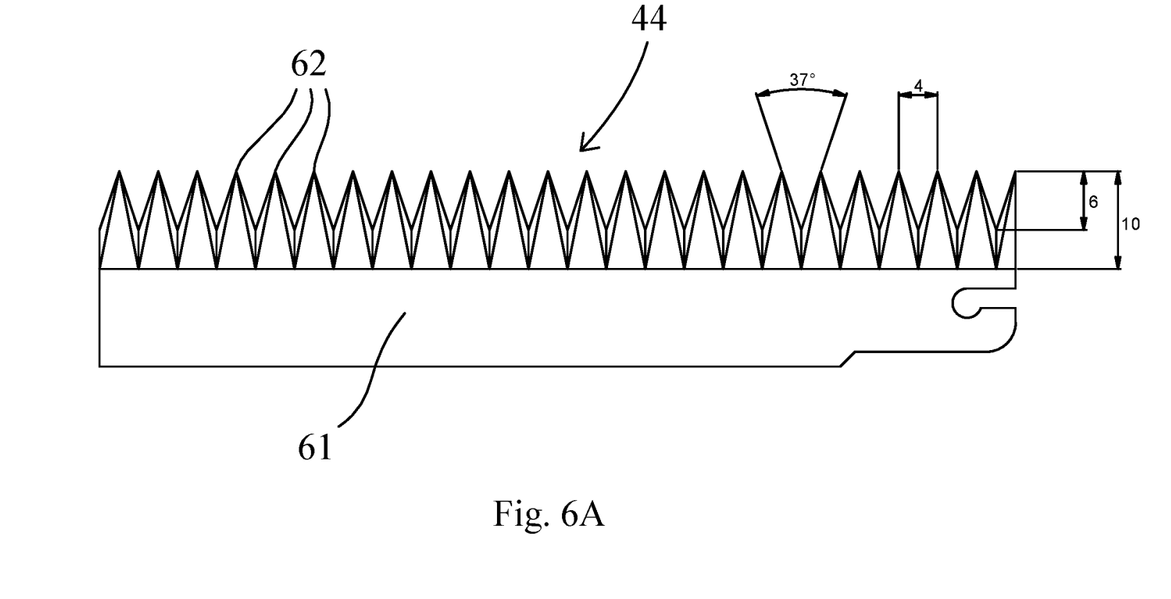
FIG. 6 is a representation of a knife for use in the machine of FIG. 2.
Figure 6B:
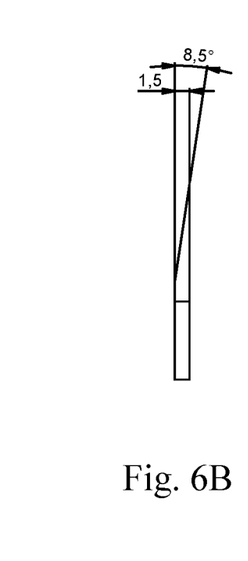

Knife 44 is shown in more detail in FIG. 6A. Blade 61 is provided with a row of teeth 62. Each tooth forms an angle with a neighboring tooth of between 30 and 37 degrees. The length of each tooth is between 4 and 8 mm. Each tooth has a sharpening angle of about 8 to 9 degrees, as shown in FIG. 6B.

Figure 3A:
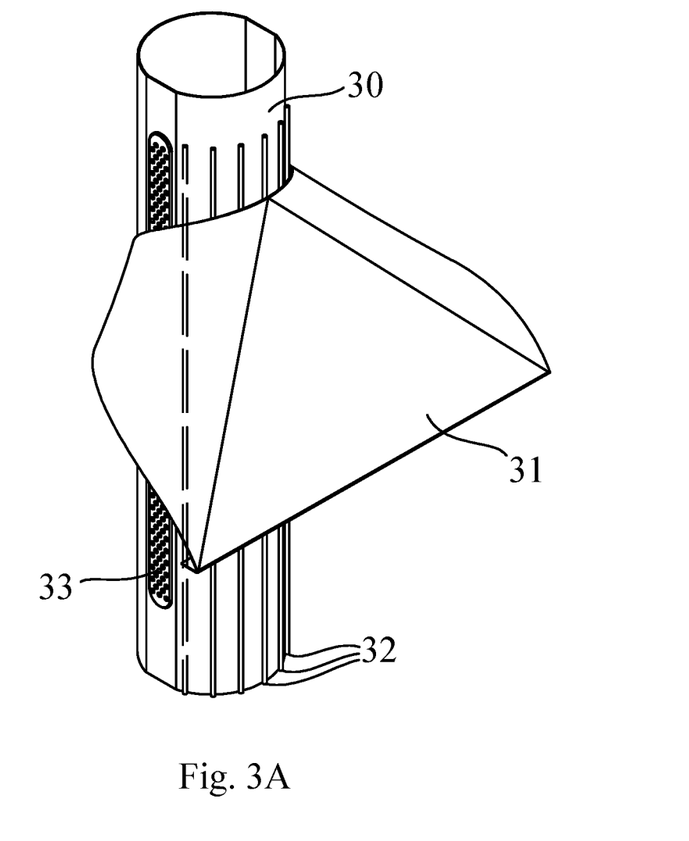
FIG. 3A is a schematic perspective view of the forming shoulder and the fill tube of the VFFS machine of FIG. 2.

FIG. 3A shows an enlarged perspective view of fill tube 30 and forming shoulder 31. As compared to plastic film, Kraft paper is less flexible. To prevent creasing of the Kraft paper as it is pulled around forming shoulder 31, the angle of forming shoulder 31 relative to the horizontal plane is more acute than might be the case for forming a package from a plastic film. For plastic packages the angle is typically about 30 degrees. For forming a paper package an angle of about >45 degrees is desirable.

It will be understood that adhesive presenting apertures 12 face fill tube 30 as the package is being formed. To reduce the area of contact between the fill tube 30 and the adhesive presenting surfaces 12 of web 10, fill tube 30 is provided with spacers. FIG. 3A shows two different examples of such spacers: vertical ribs 32, and an area 33 with a plurality of protrusions.

To further reduce the risk of the web 10 sticking to fill tube 30, the fill tube, or at least the spacers, may be coated with a non-stick coating. Examples of a suitable non-stick coating include polytetrafluoroethylene (available under the brand name Teflon®) and silicone.

Figure 3B:
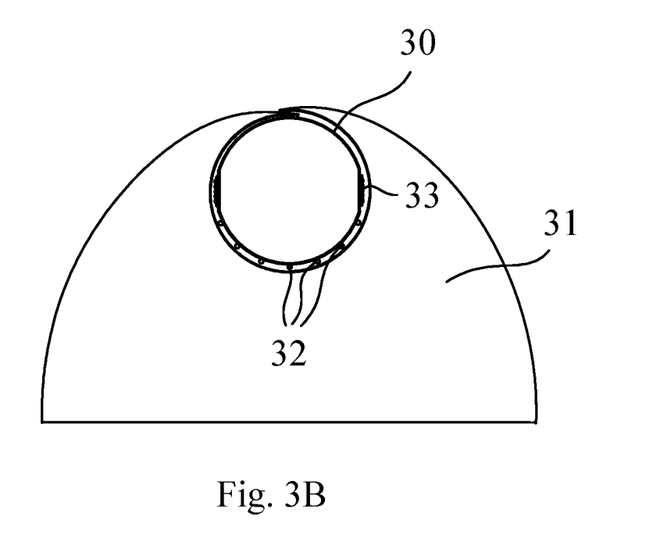
FIG. 3B is a schematic top view of the forming shoulder and the fill tube of the VFFS machine of FIG. 2.

FIG. 3B shows a top view of the assembly of fill tube 30 and forming shoulder 31.

Figure 4A:
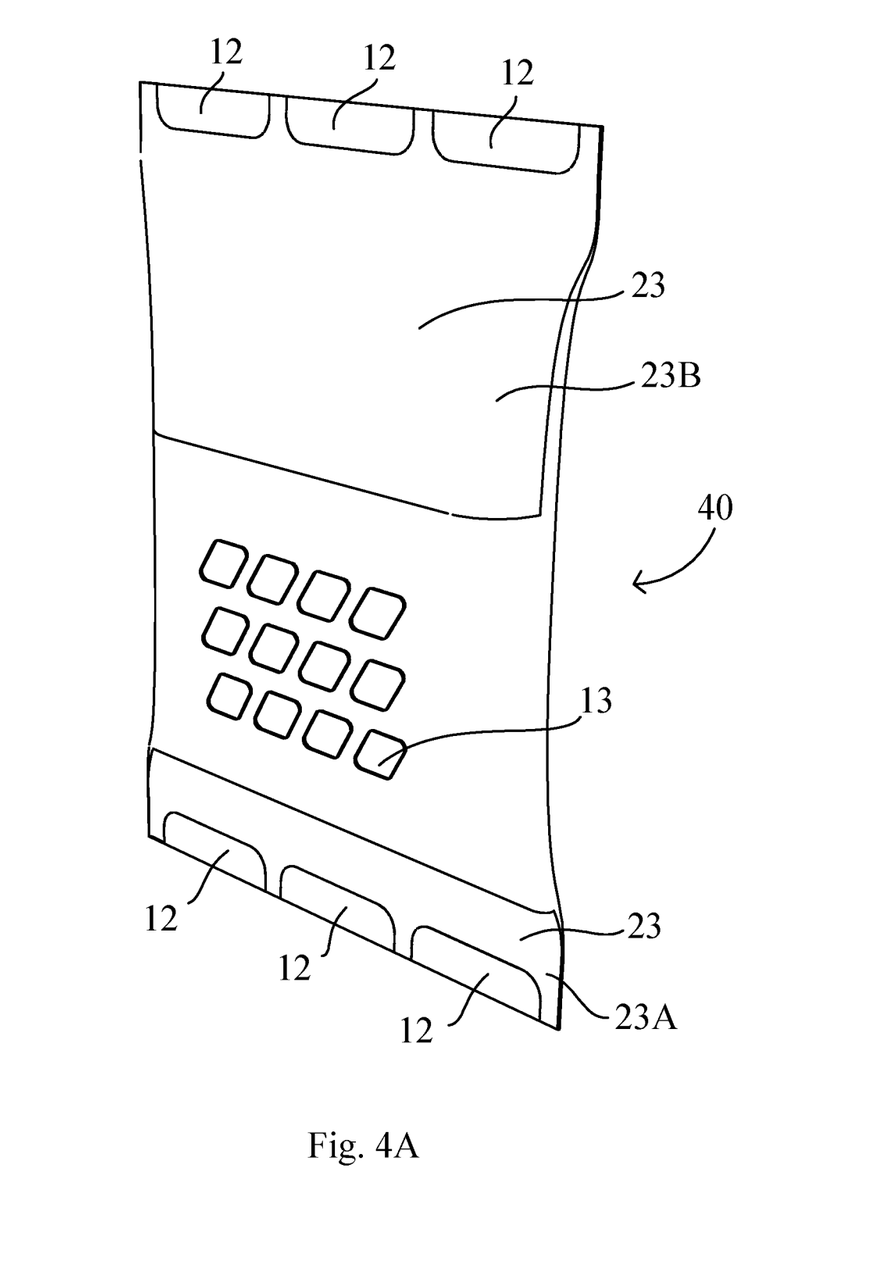
FIG. 4A is a front view of a package formed by the method of the invention.

FIG. 4A shows a front view of finished package 40. The front face of package 40 comprises label 23. As a result of the cutting action of knife 44 (see FIG. 2), label 23 is present as two separate pieces 23A and 23B. Apertures 12, outlined with dotted lines, are under the label material 23. As can be seen in FIG. 4A, the registry if the cutting action is such that the package is cut off the tube along the center line of apertures 12.

Figure 4B:
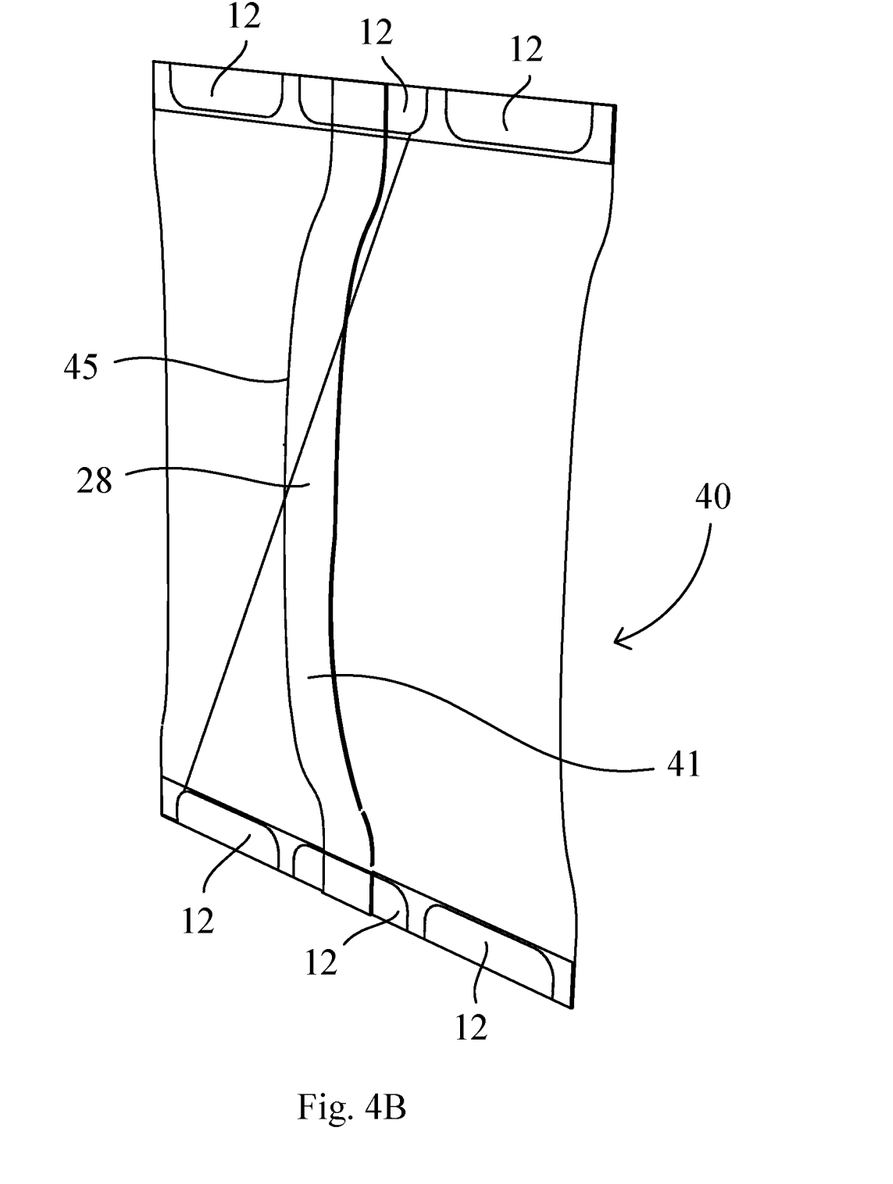
FIG. 4B is a rear view of a package formed by the method of the invention.

FIG. 4B shows the back side of package 40. The contours of apertures 12 are indicated in dotted lines. Longitudinal seal 41 is formed by the adhesive action of two-sided tape 28, the contours of which are indicated by a dotted line 45.

Figure 5:
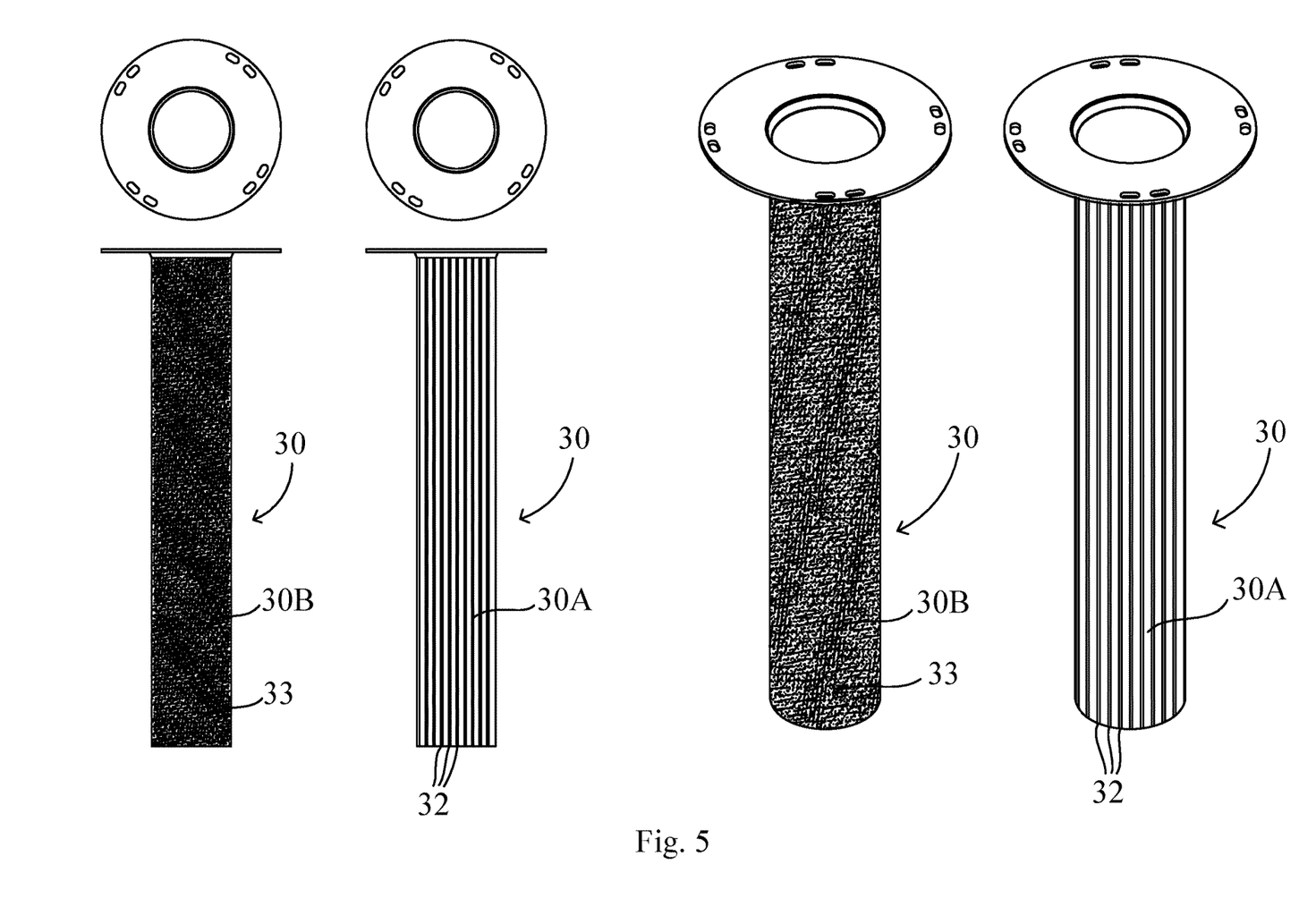
FIG. 5 is a representation of alternate fill tubes for use in the machine of FIG. 2.

FIG. 5 shows alternate embodiments of fill tube 30. Embodiment 30A is a fill tube having vertical ribs 32 all around the surface of the tube. Embodiment 30B is a fill tube fully covered with small spacers 33.

Figure 7:
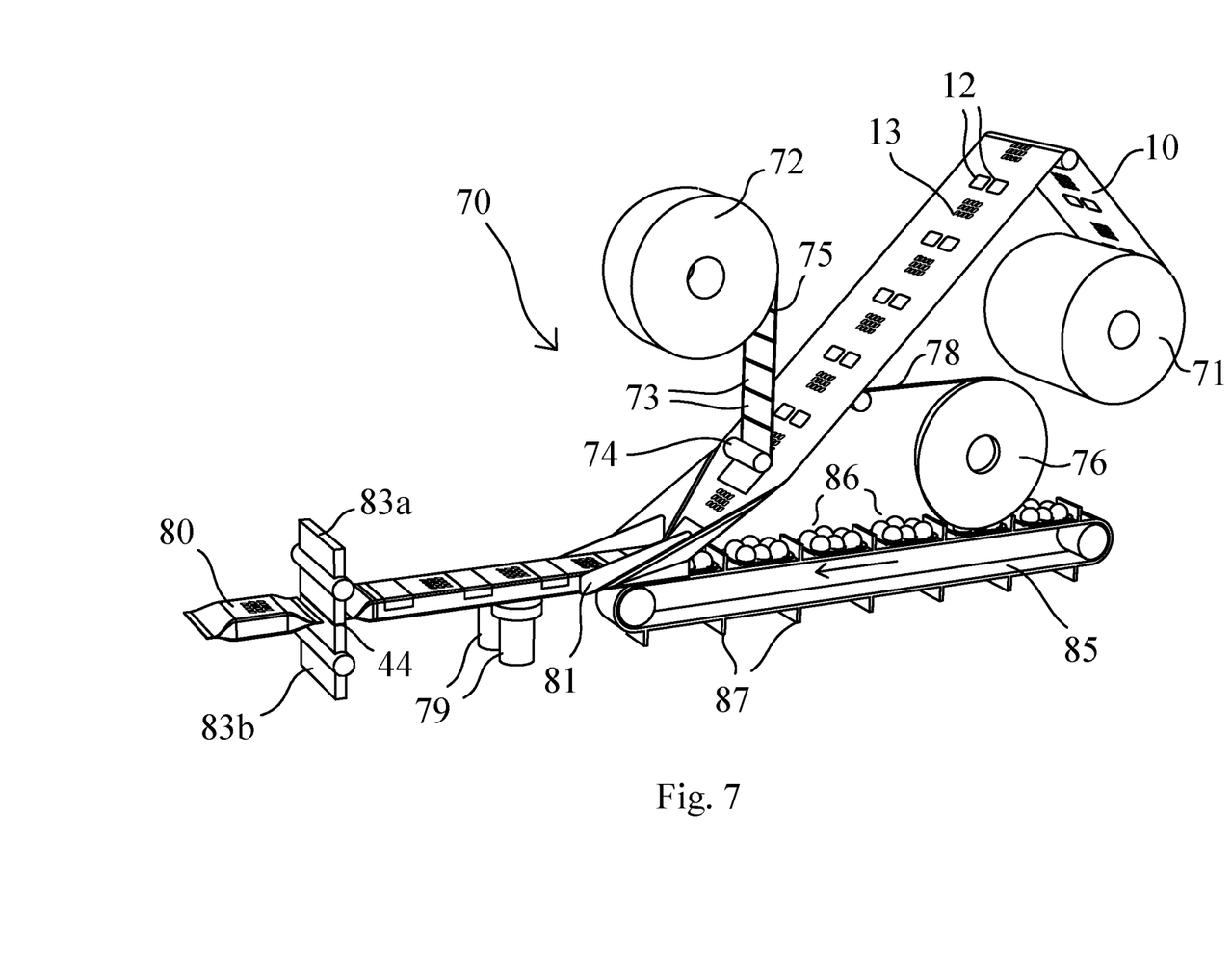
FIG. 7 is a schematic representation of a HFFS machine for use in the method of the invention.

FIG. 7 schematically shows a Horizontal Form Fill Seal (HFFS) machine 70, adapted for the process and the package of the present invention. Roll 71 contains a continuous web 10 of a Kraft paper adapted for the package of the present invention, as described above with reference to FIG. 1. Web 10 comprises registration markers (not shown), apertures 12 for presenting an adhesive surface, and apertures 13 for providing breathability.

Roll 72 contains labels 73 on a liner 75. Labels 73 are provided with an adhesive that it used for adhering labels 73 to web 10. Module 74 removes labels 73 from liner 75, and adheres them to web 10. The operation of module 74 is synchronized with the travel of web 10 to ensure that labels 73 each fully cover a set of apertures 12. As shown, labels 73 are wider (in the machine direction of HFFS machine 70) than would be required to fully cover a set of apertures 12, to provide additional strength to the finished package. In other embodiments the width of labels 73 is chosen so as to just fully cover a set of apertures 12. After labels 73 have been applied to web 10, the web presents areas of adhesive at the locations of apertures 12.

Roll 76 contains double sided tape 78, which is unwound and applied to web 10. Double sided tape is covered by a liner, which is removed as the tape is being applied to web 10. The liner may be sucked up by a vacuum hose and conveyed to a bin (not shown). The manner in which the liner is discarded is not relevant to the invention.

Conveyor belt 85 conveys product 86 (in this example trays of pressed cardboard containing fruits) towards former 81. Individual trays are pushed into former 81 by separators 87 on conveyor belt 85.

Web 10 is pulled over former 81 around product trays 86, in usual fashion. Rollers 79 press an overlapping edge of web 10 against the exposed double-sided tape 78 to form a machine direction fin seal (not shown).

Pressure blocks 83*a* and 83*b* compress the tube in the area of apertures 12 to form a cross-machine direction seal. Completed package 80 is separated from the tube by operation of knife 44, which operates in synchrony with pressure blocks 83*a* and 83*b*.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for making a biodegradable package on a form-film-seal machine, said method comprising the steps of:
   a. providing a continuous web of a biodegradable material, said web having a machine direction and a cross-machine direction;
   b. providing on the web discrete areas of exposed adhesive;
   c. forming a seal in the machine direction of the web by adhering overlapping edges of the web to one another; and
   d. forming seals in the cross-machine direction of the web using the discrete areas of exposed adhesive,
   wherein the discrete areas of exposed adhesive are formed by providing apertures in the web, said apertures being arranged in sets, and by applying adhesive labels to the web so that each adhesive label covers a set of apertures.

2. The method of claim 1, wherein the method is carried out on a horizontal form-fill-seal (HFFS) machine.

3. The method of claim 1, wherein the method is carried out on a vertical form-fill-seal (VFFS) machine.

4. The method of claim 1, wherein the step of forming the seal in the machine direction of the web comprises adhering double-sided tape to the web along a longitudinal edge of the web.

5. The method of claim 1, wherein the biodegradable material forming the web is paper.

6. The method of claim 5, wherein the biodegradable material forming the web is Kraft paper.

7. The method of claim 3, comprising the sequential steps of:
   a. providing the continuous web of the biodegradable material;
   b. providing on the web the discrete areas of exposed adhesive;
   c. pulling the continuous web over a forming shoulder and along a fill tube of the machine so that the discrete areas of exposed adhesive face the fill tube;
   d. forming the seal in the machine direction of the web by adhering the overlapping edges of the web to one another; and
   e. forming the seals in the cross-machine direction of the web using the discrete areas of exposed adhesive;
   wherein: the fill tube has protrusions to minimize contact with the web; or the fill tube is coated with a non-stick coating; or both.

8. The method of claim 7 wherein the fill tube is provided with spacers for limiting contact of the web with the fill tube.

9. The method of claim 8 wherein the spacers comprise ribs running in a longitudinal direction of the fill tube.

10. The method of claim 8, wherein the spacers of the fill tube are coated with a non-stick coating.

11. A method for making a biodegradable package on a form-film-seal machine, said method comprising the steps of:
    a) providing a continuous web of a biodegradable material, said web having a machine direction and a cross-machine direction and comprising apertures arranged in a pattern of repeating sets along the cross-machine direction of the web;
    b) providing on the web discrete areas of exposed adhesive, wherein the discrete areas of exposed adhesive are formed by applying labels to the web so that each label covers a set of one or more of the apertures;
    c) forming a seal in the machine direction of the web by adhering overlapping edges of the web to one another; and
    d) forming seals in the cross-machine direction of the web using the discrete areas of exposed adhesive.

12. The method of claim 11, wherein the method is carried out on a horizontal form-fill-seal (HFFS) machine or a vertical form-fill-seal (VFFS) machine.

13. The method of claim 11, wherein the step of forming the seal in the machine direction of the web comprises adhering double-sided tape to the web along a longitudinal edge of the web.

14. The method of claim 11, wherein the biodegradable material forming the web is paper.

15. The method of claim 11, wherein the biodegradable material forming the web is Kraft paper.

* * * * *